US012609444B2

(12) United States Patent
Zweers

(10) Patent No.: US 12,609,444 B2
(45) Date of Patent: Apr. 21, 2026

(54) ANTENNA FOR LIGHTBULBS

(71) Applicant: Qorvo US, Inc., Greensboro, NC (US)

(72) Inventor: Jan-Willem Zweers, Nieuwleusen (NL)

(73) Assignee: Qorvo US, Inc., Greensboro, NC (US)

( * ) Notice: Subject to any disclaimer, the term of this patent is extended or adjusted under 35 U.S.C. 154(b) by 186 days.

(21) Appl. No.: 18/273,486

(22) PCT Filed: Feb. 24, 2022

(86) PCT No.: PCT/US2022/070806
§ 371 (c)(1),
(2) Date: Jul. 20, 2023

(87) PCT Pub. No.: WO2022/183195
PCT Pub. Date: Sep. 1, 2022

(65) Prior Publication Data

US 2024/0128640 A1 Apr. 18, 2024

Related U.S. Application Data

(60) Provisional application No. 63/154,417, filed on Feb. 26, 2021.

(51) Int. Cl.
*H01Q 1/44* (2006.01)
*H01Q 1/02* (2006.01)
(Continued)

(52) U.S. Cl.
CPC ................. *H01Q 1/44* (2013.01); *H01Q 1/02* (2013.01); *H01Q 1/364* (2013.01); *H01Q 21/0025* (2013.01)

(58) Field of Classification Search
CPC ............ H01Q 1/44; H01Q 1/02; H01Q 1/364; H01Q 21/0025; H01Q 13/10; H01Q 21/28;
(Continued)

(56) References Cited

U.S. PATENT DOCUMENTS 9,559,407 B2 1/2017 Van Dijk et al.
10,587,846 B1 3/2020 Berg et al.
(Continued)

FOREIGN PATENT DOCUMENTS

CN 211625172 U 10/2020
EP 0824764 A1 2/1998
(Continued)

OTHER PUBLICATIONS

Kang, D.-G. et al., "MIMO Antenna with High Isolation for WBAN Applications," International Journal of Antennas and Propagation, vol. 2015, Article ID 370763, Jul. 2015, Hindawi Publishing Corporation, 7 pages.
(Continued)

*Primary Examiner* — Hoang V Nguyen
*Assistant Examiner* — Anna N Hamadyk
(74) *Attorney, Agent, or Firm* — Withrow & Terranova, P.L.L.C.

(57) ABSTRACT

An antenna in a lightbulb may include a conductive plane (e.g., a ground plane) that includes an edge-enabled void antenna (EEVA) with the EEVA including a corresponding edge-enabled void isolator (EEVI). Use of both the EEVA and the EEVI allows for a small antenna footprint for incorporation into a lightbulb. Optionally, two EEVAs, each with a corresponding EEVI may be used. Various arrangements are provided to illustrate possible compromises between structural integrity and cooling. Further, by using two EEVAs, diversity reception and transmission is possible, increasing the utility of the lightbulb by expanding directionality of the transmission/reception and/or improving communication through spatial diversity.

19 Claims, 12 Drawing Sheets

(51) Int. Cl.
*H01Q 1/36* (2006.01)
*H01Q 21/00* (2006.01)

(58) Field of Classification Search
CPC ...... H01Q 1/48; H01Q 1/521; F21Y 2103/10; F21Y 2115/10; F21K 9/238; F21K 9/232; F21V 29/713
See application file for complete search history.

(56) References Cited

U.S. PATENT DOCUMENTS

| | | | | |
|---|---|---|---|---|
| 11,063,350 | B2 | 7/2021 | Zweers | |
| 2007/0152881 | A1* | 7/2007 | Chan | H01Q 5/35 343/702 |
| 2009/0256757 | A1* | 10/2009 | Chiang | H01Q 1/2266 343/702 |
| 2012/0112852 | A1 | 5/2012 | Manssen et al. | |
| 2013/0293425 | A1* | 11/2013 | Zhu | H01Q 1/521 343/702 |
| 2016/0072176 | A1* | 3/2016 | Van Dijk | H01Q 1/02 343/721 |
| 2016/0285160 | A1 | 9/2016 | Tatomirescu et al. | |
| 2018/0090826 | A1 | 3/2018 | Da Costa Bras Lima et al. | |
| 2019/0305423 | A1 | 10/2019 | Hussain et al. | |
| 2020/0112089 | A1 | 4/2020 | Zweers | |
| 2021/0280967 | A1* | 9/2021 | Wu | H01Q 1/48 |
| 2023/0283698 | A1* | 9/2023 | Wang | H01Q 13/10 |

FOREIGN PATENT DOCUMENTS

| | | | |
|---|---|---|---|
| EP | 2826098 | A1 | 1/2015 |
| EP | 3852192 | A1 | 7/2021 |
| KR | 20180051056 | A | 5/2018 |
| WO | 2022183169 | A1 | 9/2022 |

OTHER PUBLICATIONS

International Search Report and Written Opinion for International Patent Application No. PCT/US2022/070806, mailed Jun. 9, 2022, 19 pages.

International Search Report and Written Opinion for International Patent Application No. PCT/US2022/070723, mailed May 24, 2022, 14 pages.

* cited by examiner

ANTENNA FOR LIGHTBULBS

RELATED APPLICATIONS

This application is a 35 USC 371 national phase filing of International Application No. PCT/US2022/070806, filed Feb. 24, 2022, which claims the benefit of U.S. provisional patent application Ser. No. 63/154,417, filed Feb. 26, 2021, the disclosures of which are incorporated herein by reference in their entireties.

FIELD OF THE DISCLOSURE

The technology of the disclosure relates generally to a radio frequency (RF) antenna used in a lightbulb and more particularly in a light emitting diode (LED) lightbulb.

BACKGROUND

Wireless devices have become increasingly common in current society. The prevalence of these wireless devices is driven in part by the many functions that are now enabled on such devices. Increased processing capabilities in such devices means that wireless devices have evolved from being pure communication tools into sophisticated multimedia centers that can interact with a variety of connected devices in such wireless environments as the Internet-of-Things (IoT).

As capabilities of the wireless devices increase, so does the number of active and/or passive components in the wireless devices. Contrary to increased component count and integration complexity, form factors for the wireless devices have become more and more compact. As a result, real estate inside the form factor becomes increasingly scarce.

A wireless device may include a number of antennas to provide receive diversity and/or enable such advanced transmit mechanisms as multiple-input, multiple-output (MIMO) and beamforming. Notably, an antenna typically requires sufficient spatial separation from other active/passive components in the wireless device so as to radiate effectively an electromagnetic wave(s). As such, it may be desirable to provide as many antennas as needed in the wireless device, without having to increase the footprint of the wireless device. Even when plural antennas are not in use, there are opportunities for improved antenna design for IoT devices.

SUMMARY

Aspects disclosed in the detailed description include an antenna in a lightbulb. In a particular exemplary aspect, a cooling cone in the lightbulb may include a conductive plane (e.g., a ground plane) that includes an edge-enabled void antenna (EEVA) with the EEVA including a corresponding edge-enabled void isolator (EEVI). Use of both the EEVA and the EEVI allows for a small antenna footprint for incorporation into a lightbulb. In a further exemplary aspect, two EEVAs, each with a corresponding EEVI may be used. Various arrangements are provided to illustrate possible compromises between structural integrity and cooling. Further, by using two EEVAs, diversity reception and transmission is possible, increasing the utility of the lightbulb by expanding directionality of the transmission/reception and/or improving communication through spatial diversity.

In one aspect, an antenna system is disclosed. The antenna system comprises a conductive plane having a geometric perimeter. The conductive plane delimits an EEVA, wherein the EEVA extends from the geometric perimeter of the conductive plane toward a geometric center of the conductive plane. The antenna system also comprises a substrate positioned underneath the conductive plane. The antenna system also comprises a cooling disc positioned underneath the substrate. The cooling disc is generally planar and delimits at least a first portion of an EEVI associated with the EEVA.

In another aspect, a lightbulb is disclosed. The lightbulb comprises a bottom post. The lightbulb also comprises a cooling cone positioned on top of the bottom post and extending upwardly therefrom. The lightbulb also comprises a cooling disc capping the cooling cone and defining a first plane. The lightbulb also comprises a substrate positioned on the cooling disc and defining a second plane parallel to the first plane. The lightbulb also comprises a conductive plane positioned on top of the substrate and defining a third plane parallel to the first plane. The conductive plane delimits an EEVA, wherein the EEVA extends from a geometric perimeter of the conductive plane toward a geometric center of the conductive plane.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
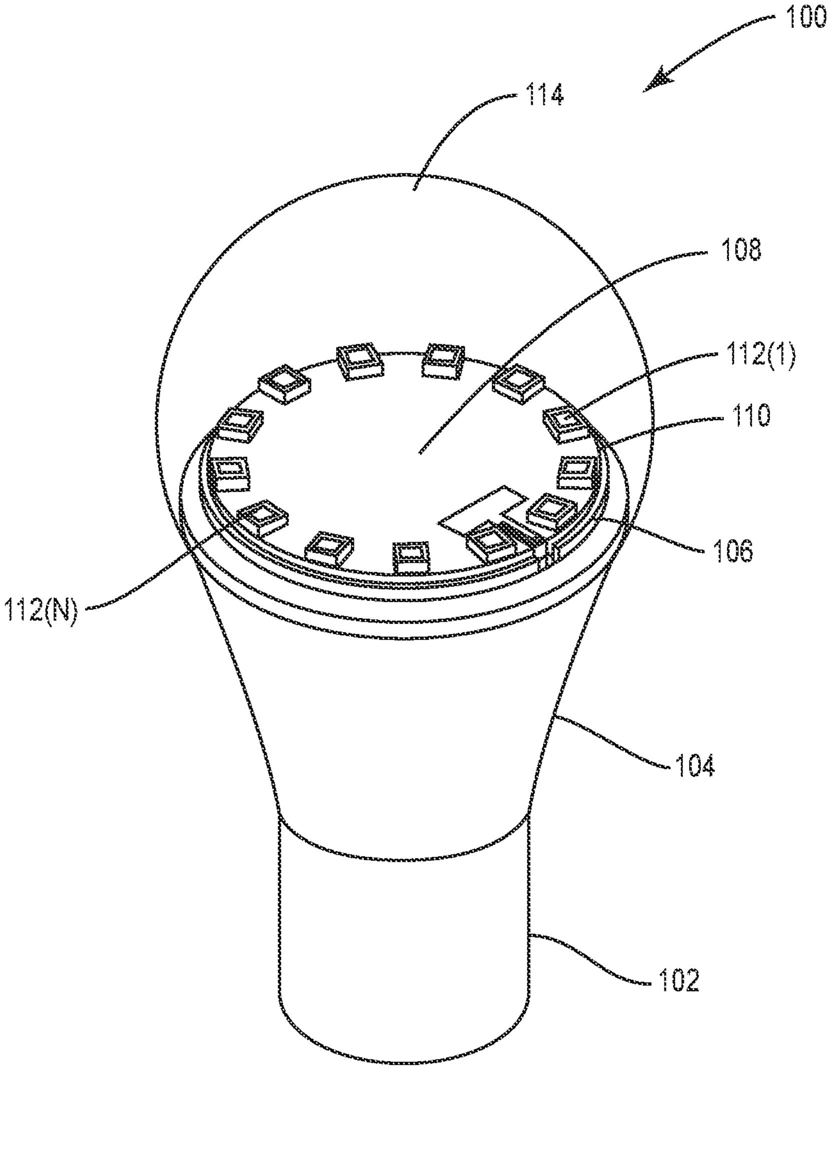
FIG. 1 is a front perspective view of a light emitting diode (LED) lightbulb that includes an antenna according to exemplary aspects of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include an antenna in a lightbulb. In a particular exemplary aspect, a cooling cone in the lightbulb may include a conductive plane (e.g., a ground plane) that includes an edge-enabled void antenna (EEVA) with the EEVA including a corresponding edge-enabled void isolator (EEVI). Use of both the EEVA and the EEVI allows for a small antenna footprint for incorporation into a lightbulb. In a further exemplary aspect, two EEVAs, each with a corresponding EEVI may be used. Various arrangements are provided to illustrate possible compromises between structural integrity and cooling. Further, by using two EEVAs, diversity reception and transmission is possible, increasing the utility of the lightbulb by expanding directionality of the transmission/reception and/or improving communication through spatial diversity.

So called "smart" homes and offices are increasingly likely to have appliances that are wirelessly connected to a central hub from which control signals may be provided. Lighting fixtures in particular are ripe for such remote control. To effectuate communication so that such control signals may be provided to light fixtures generally requires a wireless transceiver positioned within the lightbulb of the lighting fixture. The wireless transceiver necessarily includes at least an antenna that allows reception of information bearing electromagnetic signals. The size of lightbulbs poses challenges in the placement of such antennas. Further, the generally metal structures within the lightbulb and/or the lighting fixture may negatively affect radiation patterns available to the antennas.

Exemplary aspects of the present disclosure use an EEVA and an associated EEVI within a cooling cone of the lightbulb to provide an antenna with an appropriately small footprint that readily fits in the lightbulb. Further, the small size of the EEVA/EEVI pair allows two EEVA/EEVI pairs to be used to provide diversity reception at the lightbulb, thereby mitigating the impact of the metal structures in the lighting fixtures.

More information about EEVAs and EEVIs may be found in U.S. Pat. No. 11,063,350 authored by the current inventor, which is hereby incorporated by reference in its entirety. Saliently, the '350 patent describes an EEVA and an EEVI as a void that extends from the geometric perimeter of a conductive plane (e.g., a ground plane) toward a geometric center of the conductive plane. The void may take any number of shapes. The '350 patent primarily relied on rectilinear void shapes but noted that other void shapes may be used.

Exemplary aspects of the present disclosure are well suited for use with an LED lightbulb 100 such as illustrated in FIG. 1, although other lightbulbs may also benefit from the present disclosure. The lightbulb 100 may include a bottom post 102, which may be threaded (not shown) or include other means to secure the lightbulb 100 into a lighting fixture receptacle (not shown) as is well understood. The bottom post 102 is typically a conductive metal that interoperates with metal conductors in a receptacle to provide power to the elements within the lightbulb 100. The bottom post 102 may be positioned beneath a cooling cone 104. The cooling cone 104 is also likely to be metal to assist in dissipating heat more readily. The cooling cone 104 may also be encased in a nonmetallic sheath (e.g., a plastic or ceramic material). A cooling disc 106 may surmount the cooling cone 104 and be thermally coupled thereto. A conductive plane 108 may be positioned on top of the cooling disc 106 and act as a ground plane. A substrate 110 which may contain metallization layers such as a printed circuit board (PCB) (e.g., FR4 material) may separate the cooling disc 106 from the conductive plane 108. A plurality of LEDs 112(1)-112(N) may be positioned above the conductive plane 108 with appropriate connections to the conductive plane 108 and to the metallization layers within the substrate 110. A transparent glass or plastic dome 114 may cover and protect the LEDs 112(1)-112(N) and other circuitry of the lightbulb 100.

Figure 2:
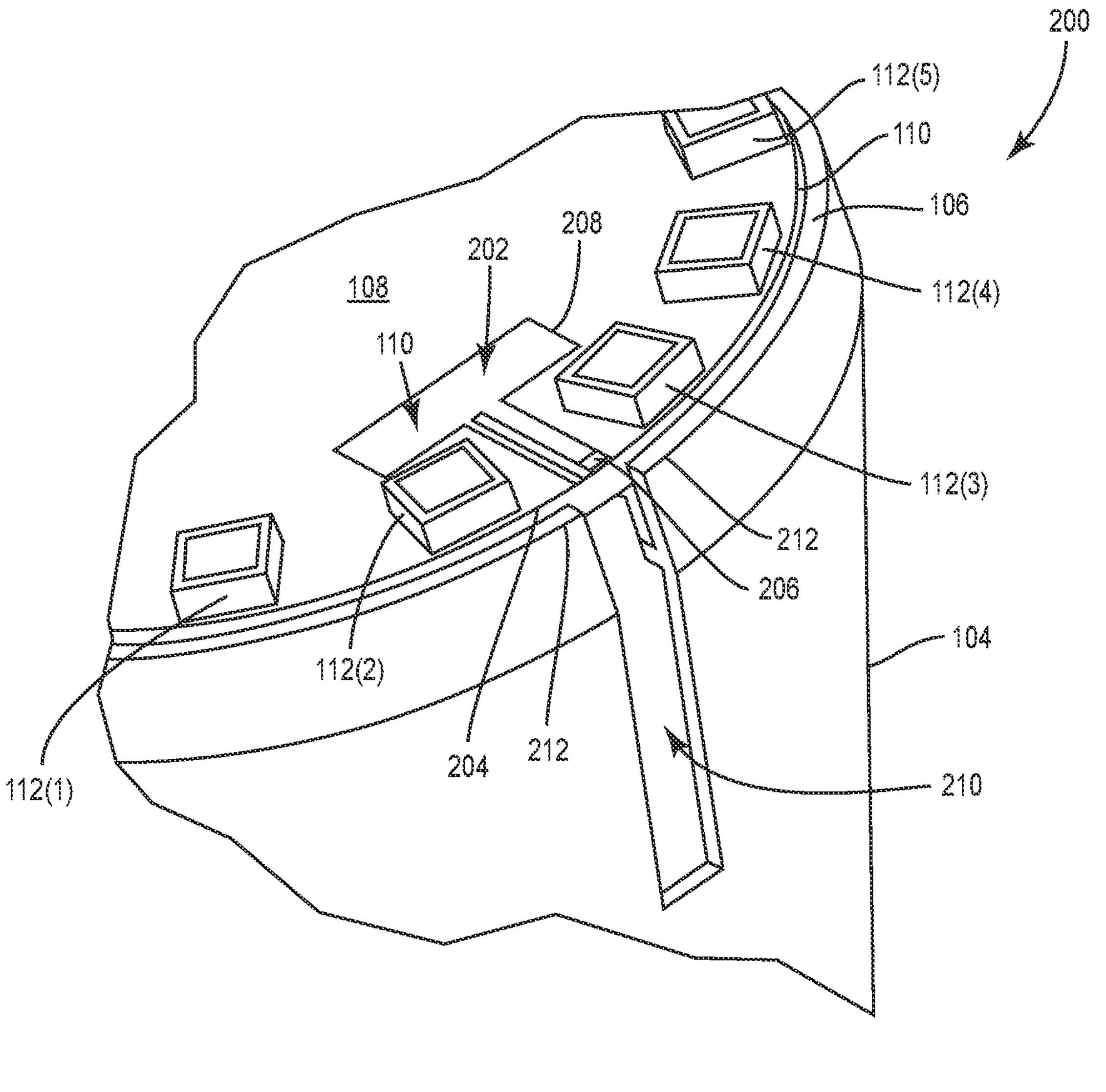
FIG. 2 illustrates a partial side perspective view of a cooling cone of an LED lightbulb with an edge-enabled void antenna (EEVA) and edge-enabled void isolator (EEVI) positioned thereon.

FIG. 2 provides a closer view of a portion 200 of the lightbulb 100. In particular, a slightly better view of the substrate 110 under the conductive plane 108 and the relative sizing of the cooling disc 106 is more readily seen. To assist in wireless communication, an EEVA 202 is created in the conductive plane 108 extending from a geometric perimeter 204 of the conductive plane 108 towards a geometric center (not shown). A port 206 couples a perimeter 208 of the EEVA 202 to transceiver circuitry (not shown). Additionally, an EEVI 210 is formed in the cooling cone 104. The EEVI 210 extends from a geometric perimeter 212 of the cooling cone 104 towards a geometric interior portion of the cooling cone 104 (in this case, downwardly away from the cooling disc 106).

While FIG. 2 shows a single EEVA 202, and particularly one shape for the EEVA 202, it should be appreciated that more antennas and other shapes may be used as illustrated in FIGS. 3A-3D. In particular, lightbulbs 300A-300D are illustrated with common elements from lightbulb 100 numbered the same. As illustrated, lightbulb 300A includes two EEVAs 302A(1)-302A(2) formed from voids in the conductive plane 108. Also illustrated is a sheath 305 that surrounds or encases the cooling cone 104.

Within the sheath 305, EEVI 210 is present in the cooling cone 104. The EEVAs 302A(1)-302A(2) are generally rectilinear with respective tuning elements 304A(1)-304A(2) connecting the main voids 306A(1)-306A(2) to the EEVI 210. Respective spurs 308A(1)-308A(2) are generally the same length as the tuning elements 304A(1)-304A(2).

Figure 3B:
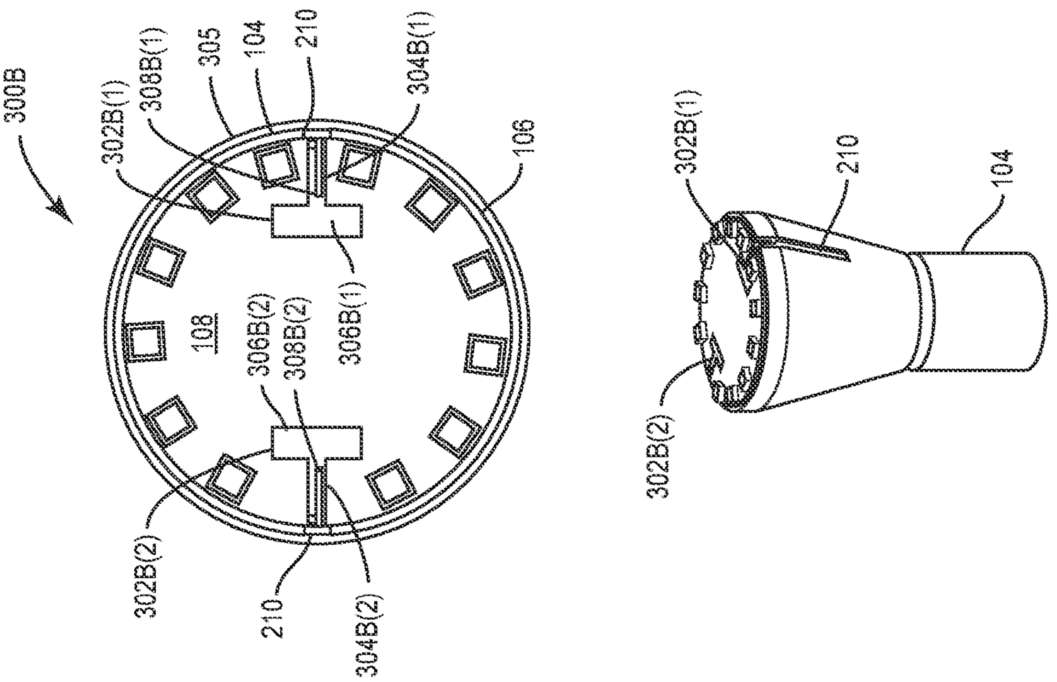
FIGS. 3A-3D illustrate top plan views of various EEVAs positioned on top of a cooling cone illustrated in side perspective views to show the corresponding EEVIs.
Figure 3A:
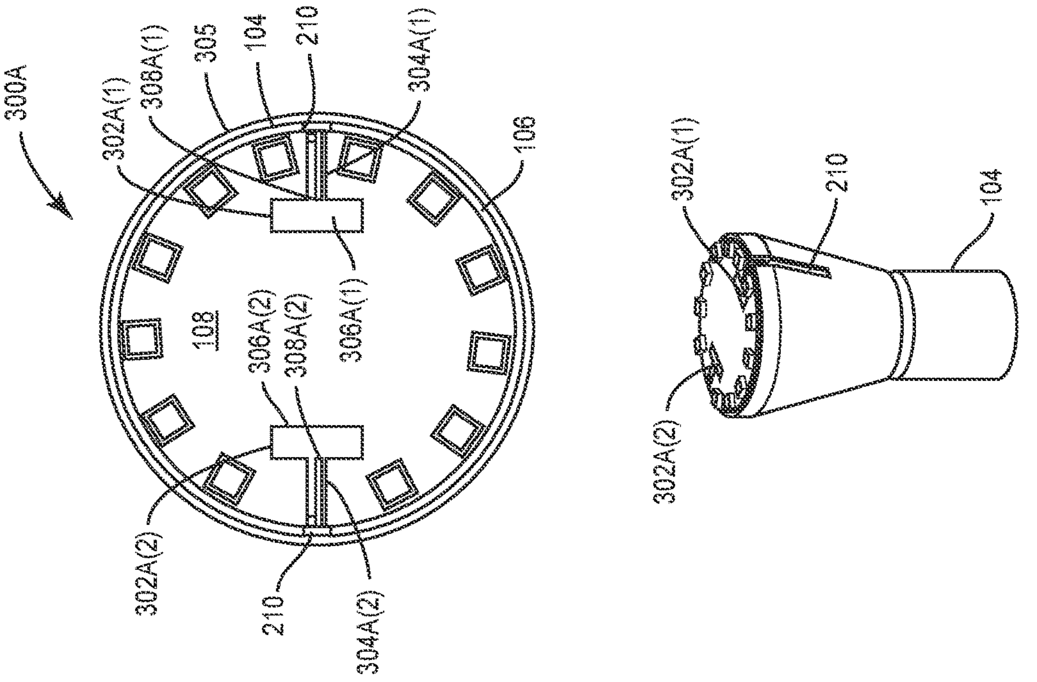
Figure 3D:
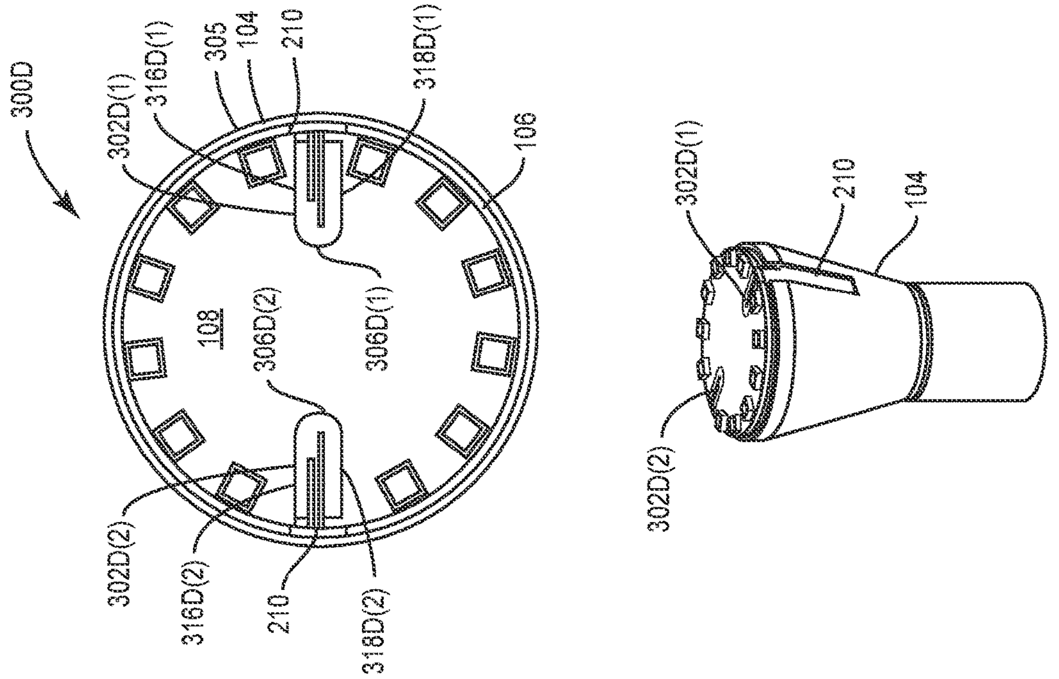

The lightbulb 300B of FIG. 3B is similar, but the tuning elements 3046(1)-3046(2) include shorter spurs 3086(1)-3086(2) that do not extend the same length as the tuning elements 304B(1)-304B(2).

Figure 3C:
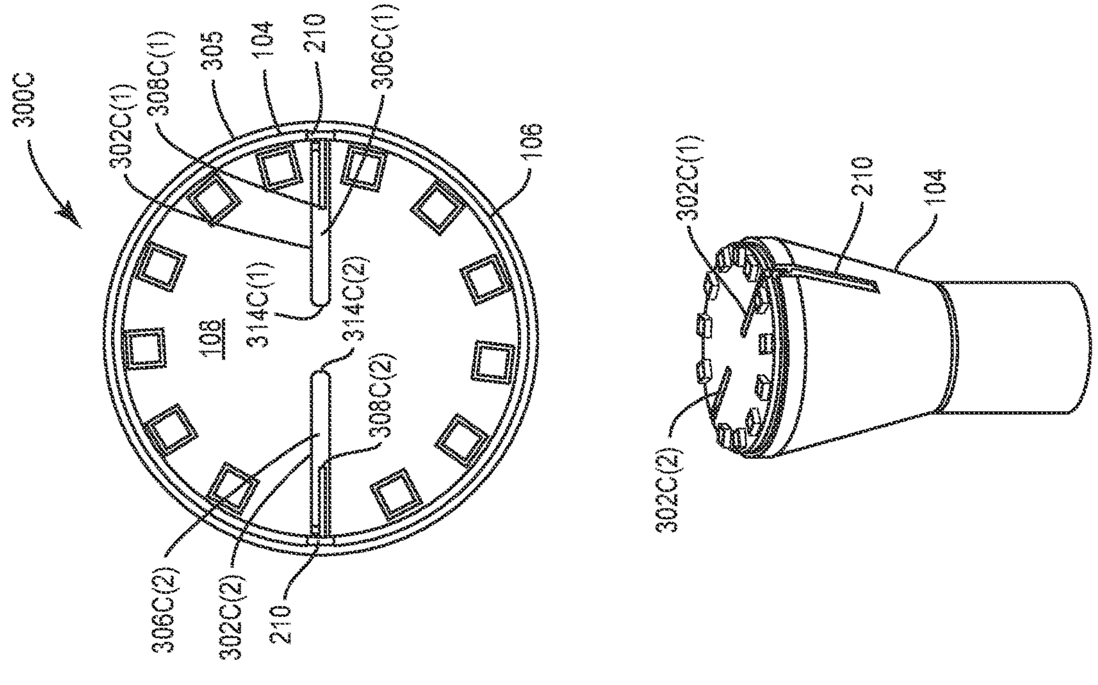
Figure 4B:
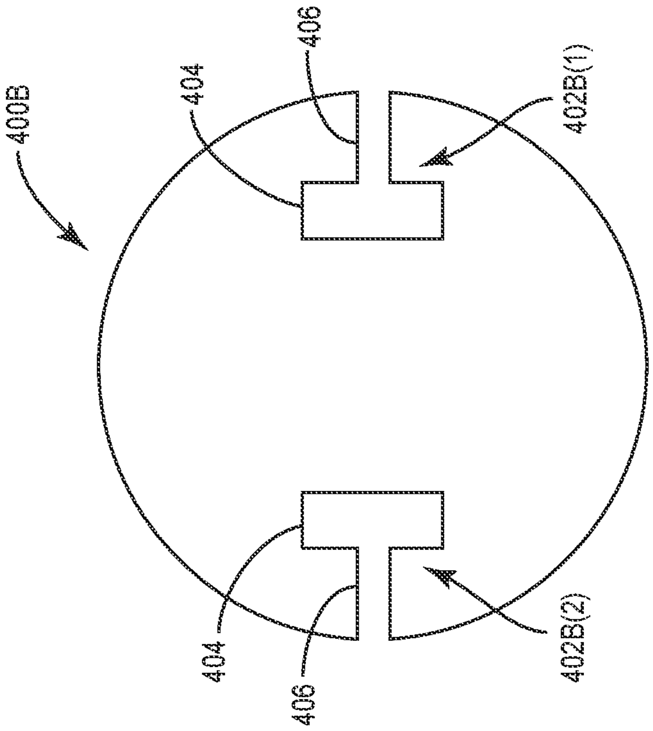
FIGS. 4A-4D show the cooling disc antenna footprint of the lightbulbs of FIGS. 3A-3D.
Figure 4A:
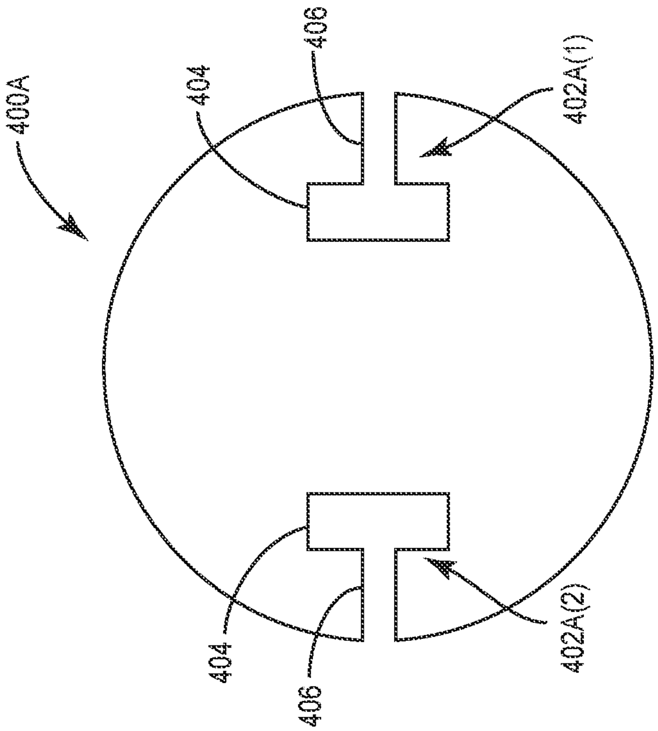
Figure 4D:
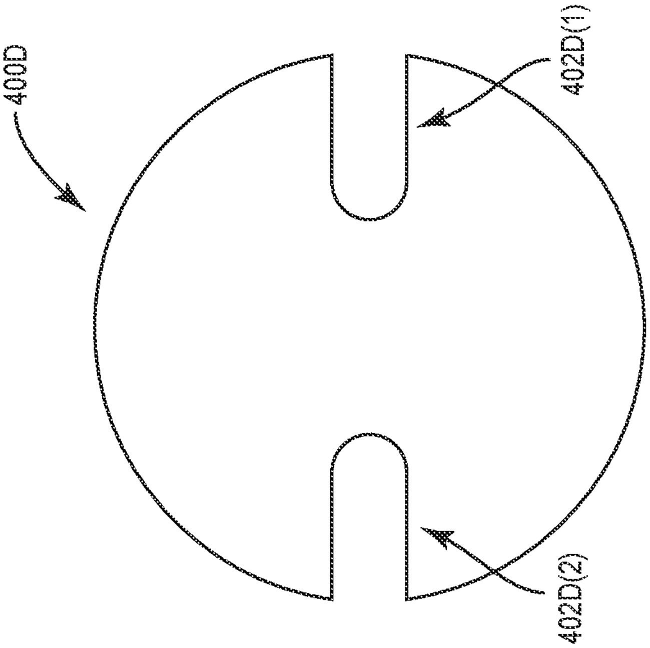
Figure 4C:
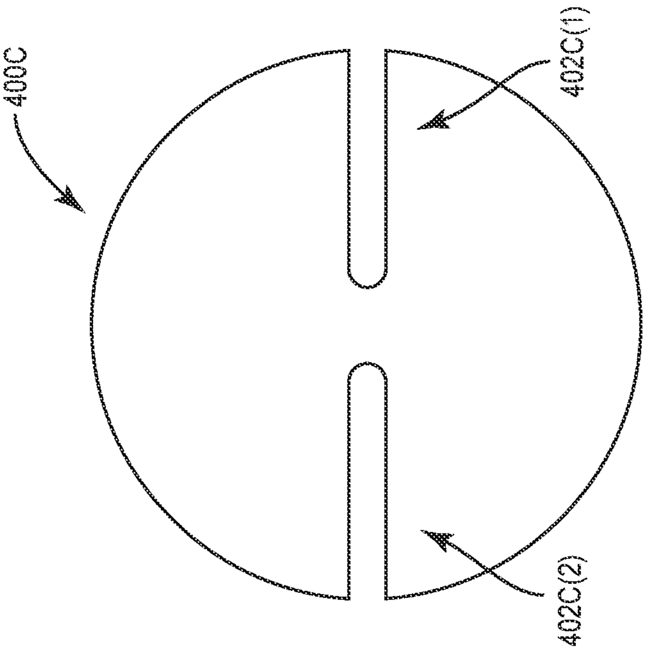

The lightbulb 300C of FIG. 3C moves away from the rectilinear main void and uses generally tubular-shaped voids 306C(1)-306C(2) with rounded ends 314C(1)-314C(2). Spurs 308C(1)-308C(2) may divide the tubular shape.

The lightbulb 300D has a generally E-shaped or euro (€) shape for the main voids 306D(1)-306D(2) with lobes 316D(1)-316D(2) and secondary lobes 318D(1)-318D(2).

FIGS. 4A-4D illustrate the EEVIs corresponding to the EEVAs of FIGS. 3A-3D. Specifically, cooling discs 400A-400D are illustrated with voids 402A(1)-402D(1), 402A(2)-402D(2). Voids 402A(1)-402A(2) and 402B(1)-402B(2) are both rectilinearly shaped with a primary void 404 and a throat 406. In contrast, the voids 402C(1)-402C(2) are more tubular in shape with a uniform width. Likewise, the voids 402D(1)-402D(2) are generally tubular, but fatter so as to accommodate the lobes 316D(1)-316D(2) of the EEVAs 302D(1)-302D(2) of FIG. 3D.

Figure 5:
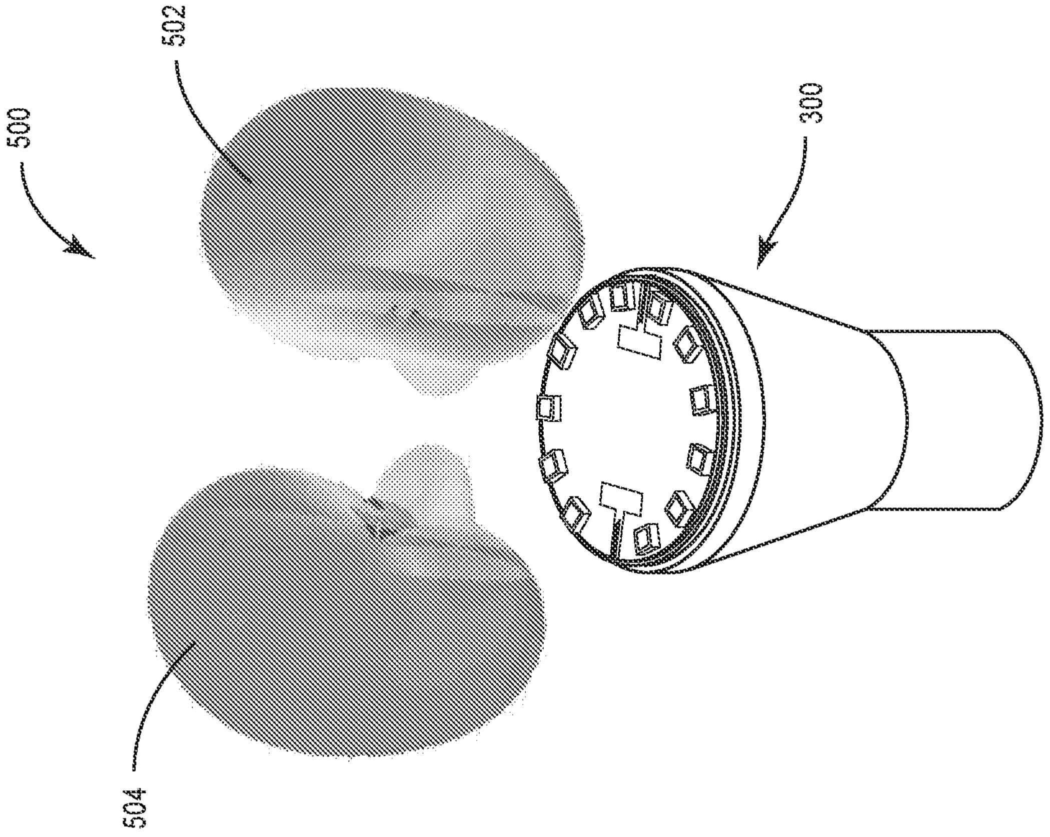
FIG. 5 illustrates a radiation pattern for the lightbulb of FIG. 3A.

FIG. 5 shows an exemplary radiation pattern 500 achievable with the two antenna systems of lightbulbs 300A-300D (generically lightbulb 300). Note that the two lobes 502, 504 are in different directions allowing for directivity or steered communication signals and/or for diversity reception and/or diversity transmission.

Figure 6B:
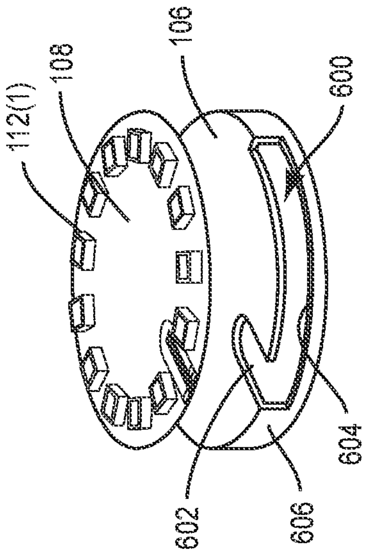
FIG. 6B shows the cooling cap and LED cap removed from the lightbulb of FIG. 6A.
Figure 6A:
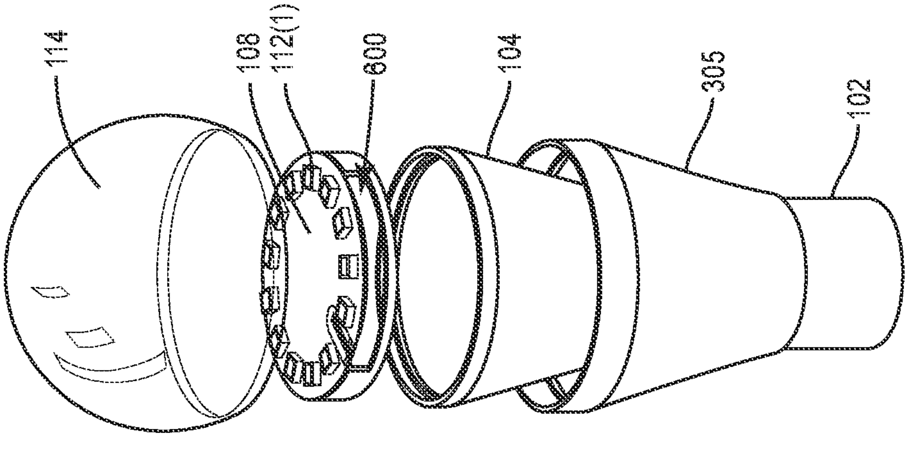
FIG. 6A is an exploded view of a lightbulb having an alternate EEVI structure.

An alternate structure for an EEVI 600 is illustrated in FIGS. 6A and 6B, where the EEVI 600 is cut into the cooling disc 106 generally parallel to a plane formed by the conductive plane 108. A portion 602 lies in the plane of the cooling disc 106 with a portion 604 extending around a perimeter of the lip 606 of the cooling disc 106.

Figure 7:
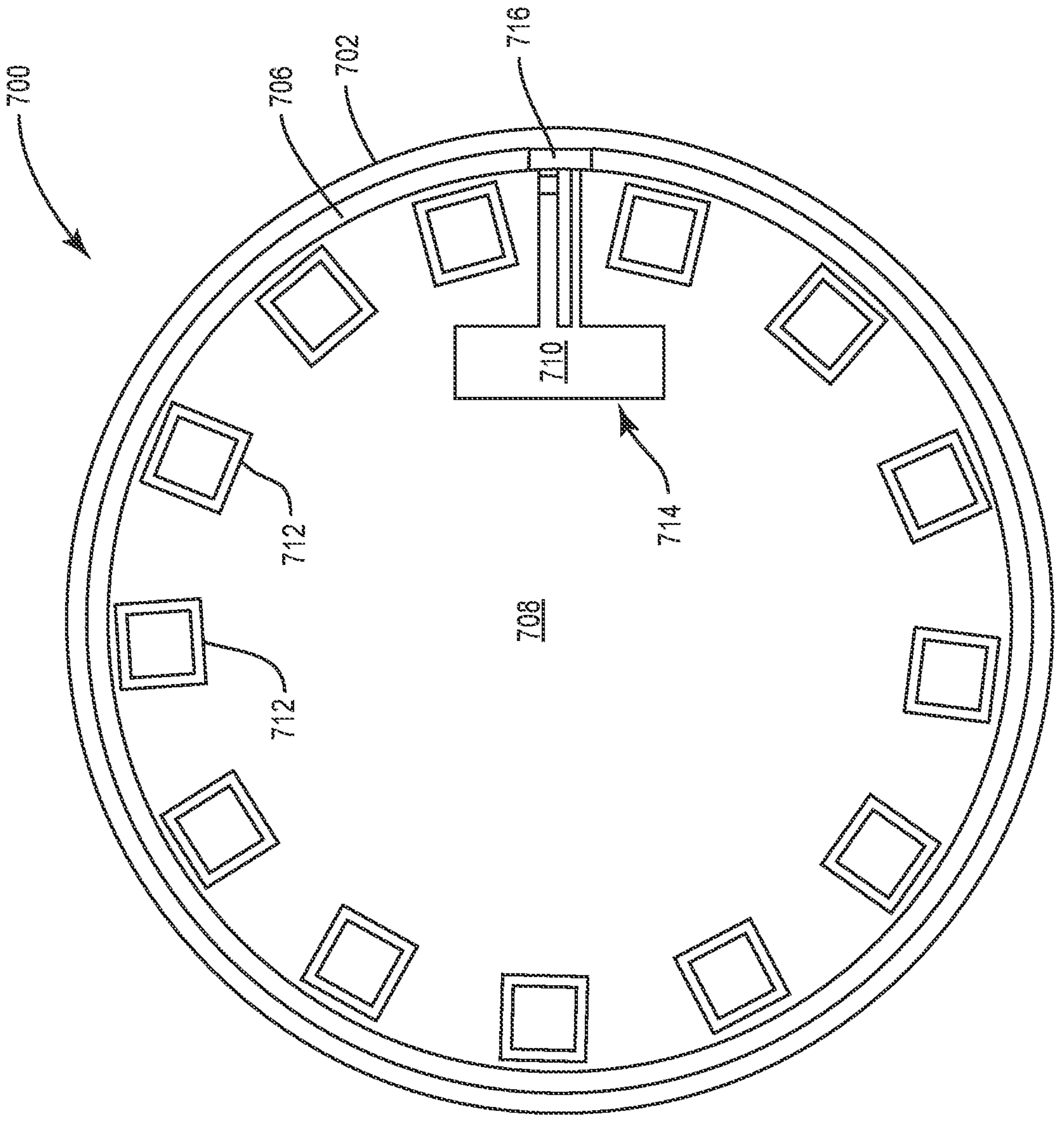
FIG. 7 illustrates a top plan view of a single antenna lightbulb structure according to an alternate exemplary aspect of the present disclosure.

While most of the above discussion has focused on a two-antenna arrangement to assist in providing diversity transmission and reception, the present disclosure is not so limited and only a single EEVA/EEVI pair may be present as better illustrated by lightbulb 700 in FIG. 7. The lightbulb 700 may include a sheath 702 that encases a cooling cone (not illustrated) attached to a bottom post (not illustrated). The cooling cone may be surmounted by a cooling disc 706. A conductive plane 708 may be positioned on top of the cooling disc 706 and act as a ground plane. A substrate 710 which may contain metallization layers such as a PCB material may separate the cooling disc 706 from the conductive plane 708. A plurality of LEDs 712 may be positioned above the conductive plane 708 with appropriate connections to the conductive plane 708 and to the metallization layers within the substrate 710. A single EEVA 714 may be positioned in the conductive plane 708 with an EEVI 716 associated therewith.

The particular shape of the EEVA 714 may be any of the shapes illustrated therein or other shape as needed or desired. Likewise, the shape of the EEVI 716 may be similar to EEVI 210 or EEVI 600.

Figure 8B:
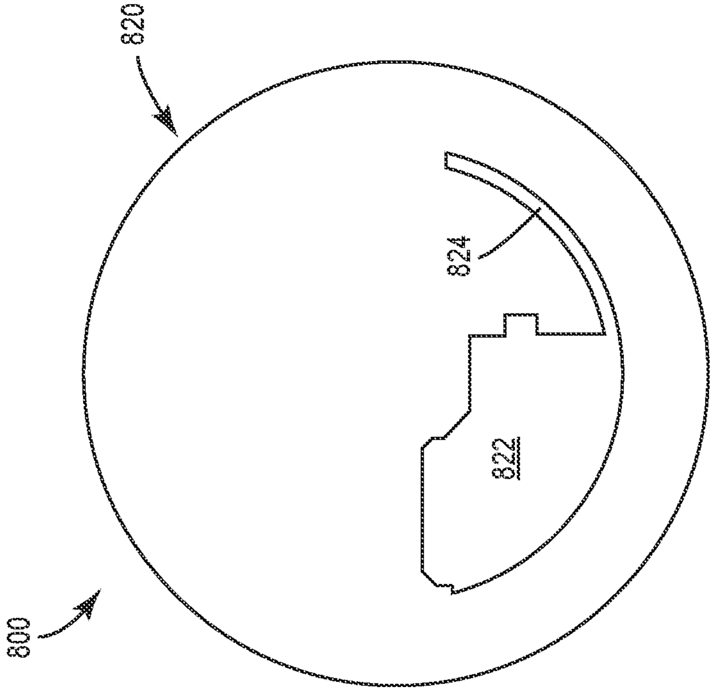
FIGS. 8A and 8B show top plan views of a substrate having a loop antenna in parallel with an EEVI in the conductive cooling disc.
Figure 8A:
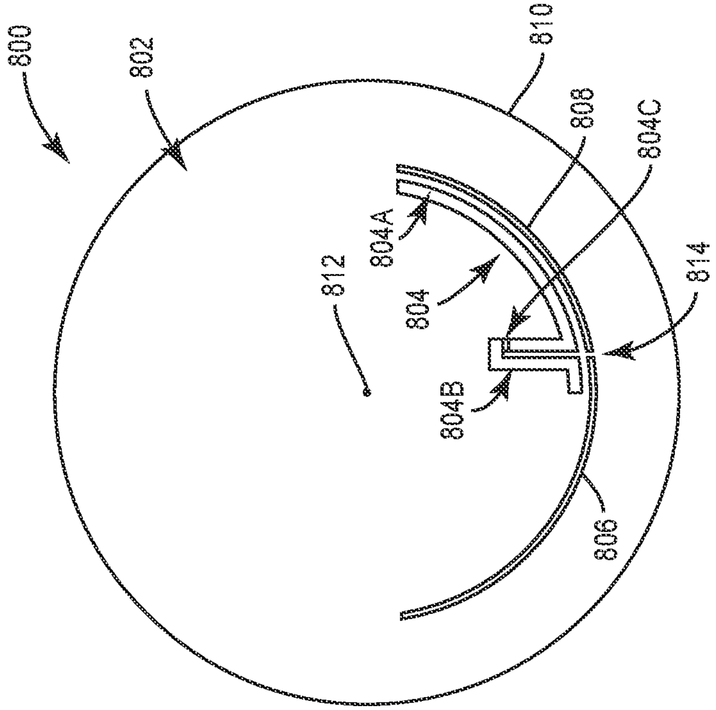

Another option would be to create an EEVA/EEVI spaced interiorly from an exterior perimeter as better seen in FIGS. 8A and 8B. Specifically, FIG. 8A illustrates a portion of a lightbulb 800, and specifically illustrates a substrate 802, with a first conductive strip 804, a second conductive strip 806, and a third conductive strip 808 printed thereon. The first conductive strip 804 includes an arcuate portion 804A and a generally U-shaped portion 804B. An RF port 804C may be positioned in the U-shaped portion 804B. The second conductive strip 806 and the third conductive strip 808 are positioned between a perimeter edge 810 and the first conductive strip 804 and generally exteriorly of the first conductive strip 804 relative to a center 812 of the substrate 802. The second conductive strip 806 and the third conductive strip 808 are arcuately shaped and collectively form a semi-circle, although a gap 814 exists between the second conductive strip 806 and the third conductive strip 808.

FIG. 8B shows a cooling disc 820 of the lightbulb 800. The cooling disc 820 may be made from a conductive material and delimits a first void 822, which acts as a loop antenna EEVA. The cooling disc 820 also delimits an arcuate void 824, which acts as an EEVI for the loop antenna EEVA. The arcuate void 824 may be approximately a quarter wavelength long at the frequencies of interest.

Figure 9A:
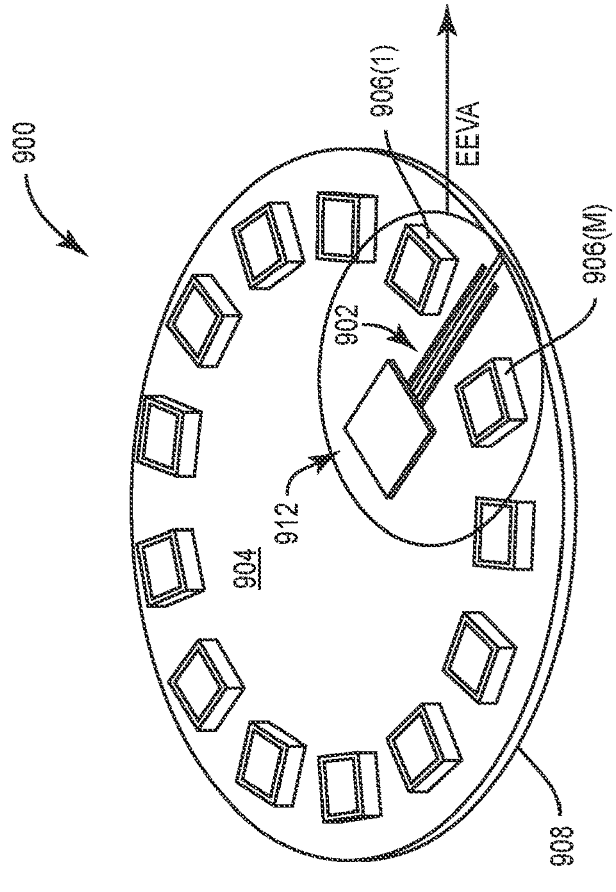
FIGS. 9A-9C show an alternate exemplary aspect where a differential antenna is provided in the form of an EEVA with an associated EEVI.
Figure 9B:
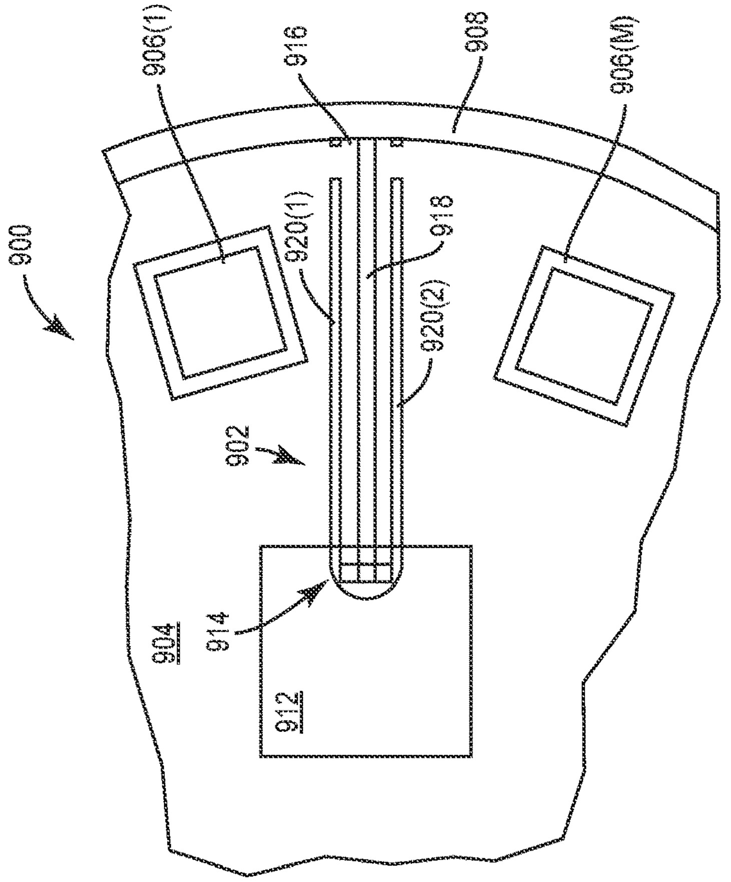
Figure 9C:
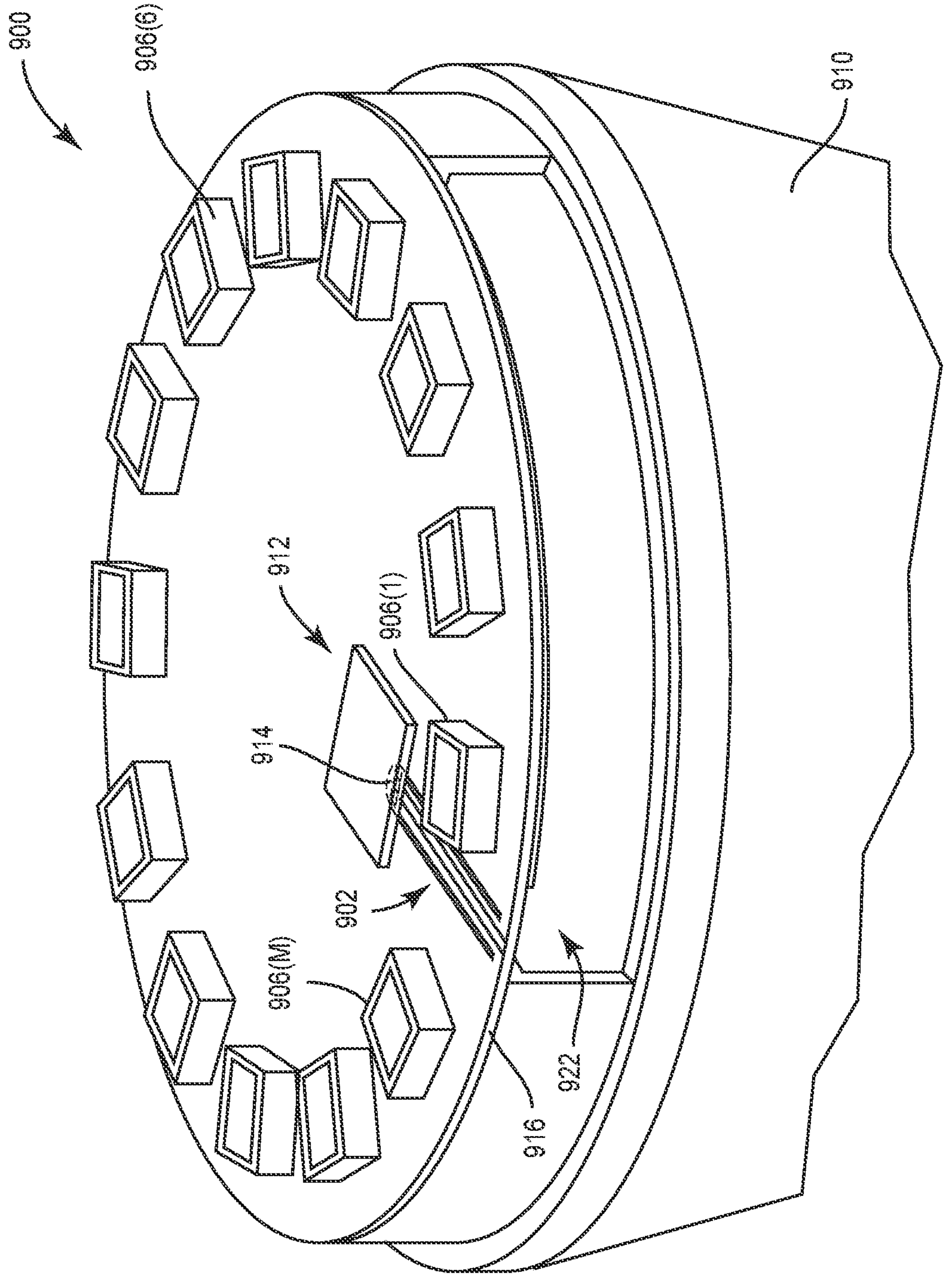

Instead of single-ended antennas such as those discussed above, it may also be possible to use a differential antenna based on the EEVA and EEVI of the present disclosure. In this regard, FIGS. 9A-9C illustrate various views of portions of a lightbulb 900 having a differential antenna 902. In particular, FIG. 9A illustrates a conductive plane 904 on which LEDs 906(1)-906(M) are positioned. The conductive plane 904 may be mounted on a PCB material or substrate 908 and be configured to be mounted in a cooling cone 910 (shown in FIG. 9C). Transceiver circuitry 912 may be positioned on the conductive plane 904 in a chip or die. Alternatively, the transceiver circuitry 912 may be positioned underneath the substrate 908 (not shown) with vias therethrough.

More detail about the differential antenna 902 is shown in FIG. 9B, where specifically, a differential connector 914 is shown within the transceiver circuitry 912. The differential antenna 902 is an EEVA extending from a perimeter 916 of the conductive plane 904 towards a geometric center (not labeled) and having a primary linearly-shaped portion 918 with two lobes 920(1)-920(2).

An associated EEVI 922 is better illustrated in FIG. 9C where the EEVI 922 extends around the cooling cone 910 instead of downwardly.

Those skilled in the art will recognize improvements and modifications to the preferred embodiments of the present disclosure. All such improvements and modifications are considered within the scope of the concepts disclosed herein and the claims that follow.

What is claimed is:

1. An antenna system comprising:

a conductive plane having a geometric perimeter, the conductive plane delimiting an edge-enabled void antenna (EEVA), wherein the EEVA extends from the geometric perimeter of the conductive plane toward a geometric center of the conductive plane;

a substrate positioned underneath the conductive plane; and a cooling disc positioned underneath the substrate, the cooling disc being generally planar in a plane and substantially continuous across a portion of the plane within a second geometric perimeter, and delimiting at least a first portion of an edge-enabled void isolator (EEVI) extending from the second geometric perimeter toward a second geometric center of the cooling disc, the EEVI associated with the EEVA.

2. The antenna system of claim 1 incorporated into a lightbulb.

3. The antenna system of claim 1, further comprising a cooling cone attached to the cooling disc, wherein the cooling cone delimits at least a second portion of the EEVI.

4. The antenna system of claim 3, wherein the second portion of the EEVI is generally linear and extends down and away from the cooling disc.

5. The antenna system of claim 1, wherein the cooling disc comprises a lip extending below and away from a plane of the cooling disc, wherein the lip delimits a second portion of the EEVI.

6. The antenna system of claim 5, wherein the second portion of the EEVI is perpendicular to the first portion.

7. The antenna system of claim 1, wherein the EEVA comprises a generally rectangular shape with a throat.

8. The antenna system of claim 1, wherein the EEVA is generally tubular shaped.

9. The antenna system of claim 1, further comprising a second EEVA delimited by the conductive plane, and a second EEVI associated with the second EEVA.

10. The antenna system of claim 9, wherein the second EEVA is positioned in the conductive plane opposite the EEVA.

11. A lightbulb comprising:

a bottom post;

a cooling cone positioned on top of the bottom post and extending upwardly therefrom;

a cooling disc formed from a substantially continuous material within a disc perimeter, the cooling disc capping the cooling cone and defining a first plane;

a substrate positioned on the cooling disc and defining a second plane parallel to the first plane;

a conductive plane positioned on top of the substrate and defining a third plane parallel to the first plane, the conductive plane delimiting an edge-enabled void antenna (EEVA), wherein the EEVA extends from a geometric perimeter of the conductive plane toward a geometric center of the conductive plane.

12. The lightbulb of claim 11, wherein the conductive plane delimits a second EEVA.

13. The lightbulb of claim 11, wherein the cooling cone and the cooling disc collectively delimit an edge-enabled void isolator (EEVI) associated with the EEVA.

14. The lightbulb of claim 11, wherein the cooling disc comprises a lip and delimits an edge-enabled void isolator (EEVI) in the first plane and in the lip.

15. The lightbulb of claim 11, further comprising a plurality of light emitting diodes (LEDs) mounted on the conductive plane.

16. The lightbulb of claim 11, wherein the EEVA comprises a generally rectangular shape and a throat.

17. The lightbulb of claim 11, wherein the EEVA is generally tubular shaped.

18. The lightbulb of claim 11, wherein the EEVA is a differential antenna.

19. The lightbulb of claim 11, wherein the EEVA is a loop antenna.

* * * * *